United States Patent Office 3,752,867
Patented Aug. 14, 1973

3,752,867
FIREPROOF POLYESTERS FROM HALOGENATED SALICYLIC ACID
Yves Merck and Jean-Marie Vion, Brussels, Belgium, assignors to UCB, Societe Anonyme, Brussels, Belgium
No Drawing. Filed Nov. 8, 1971, Ser. No. 196,742
Claims priority, application Great Britain, Nov. 10, 1970, 53,434/70
Int. Cl. C08f *21/02;* C08g *17/10*
U.S. Cl. 260—869
15 Claims

ABSTRACT OF THE DISCLOSURE

Fireproof polymers which are the polymerization products of unsaturated polyester resin compositions comprising: (a) a polycondensation product of unsaturated aliphatic polycarboxylic acids, optionally saturated aliphatic carboxylic acids or aromatic carboxylic acids, polyhydric alcohols and halogenated salicylic acids of the formula

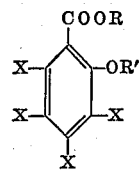

wherein X is hydrogen or halogen, at least one X being halogen, R is hydrogen, alkyl or aryl and R' is hydrogen, alkanoyl or aroyl, and (b) a monoethylenically unsaturated copolymerizable monomer.

---

The present invention is concerned with new unsaturated polyesters, with resins obtained from the latter and with fireproof polymers obtained by polymerization of said resins; the present invention is also concerned with the process of preparation of these polymers.

It is known that plastics materials in general, and those obtained from unsaturated polyesters in particular, are increasingly used in civil, aeronautical, naval and space engineering and the like because of their excellent mechanical properties, associated with a relatively low density, when compared with traditional materials, such as wood, metal, concrete and the like. Unfortunately, the majority of the plastics materials in use at the present time are inflammable and constitute a source of danger when a fire occurs. Attempts have already been made to remedy this serious shortcoming, especially in the case of polymers of unsaturated polyesters, by the incorporation of fireproofing substances, for example chlorinated compounds. These substances may, for example, be incorporated physically, i.e. by mixing, or chemically, i.e. by introduction into the polyester chain. Physical incorporation has the disadvantage of impairing the mechanical properties of polymers of unsaturated polyesters because it is necessary to add relatively considerable quantities of these substances in order to impart fireproof properties to the polymers. In addition, depending upon time and temperature, these fireproofing substances tend to evaporate and/or sublime, the result of which is that polymers which were originally fireproof gradually lose their fireproof properties.

A considerable improvement over this technique is the chemical incorporation of a bifunctional fireproofing substance into the polyester chain, the original properties of the product being thereby permanently retained. However, these substances have the disadvantage of being very expensive compared with the conventional bifunctional starting materials from which polymers of unsaturated polyesters are prepared, so that their field of application is drastically limited. This is the case, for example, with resins of unsaturated polyesters containing chlorendic acid (or HET acid), tetrachlorophthalic anhydride or acid, hydroxylated derivatives of hexachlorobicyclo-(2.2.1)-hept-4-ene or the like, as chemically-incorporated, bifunctional fireproofing substance.

There is, therefore, a demand for less expensive fireproofing substances which would make it possible, by chemical incorporation in the unsaturated polyesters, to make the polymers of the latter difficultly inflammable and achieving this in a much more economical manner than with the bifunctional fireproofing substances available at the present time. The present invention is concerned with a solution of this problem.

Therefore, according to the present invention, there is provided an unsaturated polyester resin composition, which comprises (a) A polycondensation product of at least one organic unsaturated aliphatic polycarboxylic acid, optionally an organic saturated aliphatic carboxylic acid or aromatic carboxylic acid, at least one polyhydric alcohol and at least one halogenated salicylic acid derivative of the Formula I

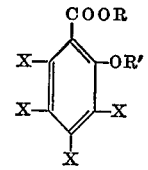

wherein

X is a hydrogen or halogen atom, such as chlorine and/or bromine, at least one of the X's being a halogen atom,
R is a hydrogen atom or an alkyl or aryl radical, and
R' is a hydrogen atom or an alkanoyl or aroyl radical, and (b) A monoethylenically unsaturated copolymerizable monomer.

The present invention is also concerned with the fireproof polymers or fireproof reinforced polymers obtained by the polymerization of the above-mentioned composition, eventually in the presence of a reinforcing material such as fibreglass mats.

By "unsaturated polyester" there is to be understood the product of polycondensation of at least one organic unsaturated aliphatic polycarboxylic acid, and optionally at least one saturated aliphatic carboxylic acid or aromatic carboxylic acid, with at least one polyhydric alcohol.

By "unsaturated polyester resin," there is to be understood the solution of the unsaturated polyester as defined above in a monoethylenically unsaturated copolymerizable monomer.

By "polymers," there are to be understood the products obtained by the polymerization of unsaturated polyester resins; these polymers are said to be "fireproof" when they are obtained from unsaturated polyesters in which, in the formulation according to the present invention, either at least a part of the unsaturated polycarboxylic acid, when said acid is the only acid used, or optionally all or part of the organic saturated aliphatic carboxylic acid or aromatic carboxylic acid, has been replaced by a halogenated salicylic acid derivative of General Formula I.

Organic unsaturated aliphatic polycarboxylic acids used for the preparation of the polyesters according to the present invention include, for example, maleic acid, fumaric acid, mesaconic acid, glutaconic acid, aconitic acid, citraconic acid, itaconic acid and the like. By "organic unsaturated aliphatic polycarboxylic acids" there are also to be understood their functional derivatives, such as their anhydrides, chlorides, esters and the like.

The organic saturated aliphatic carboxylic acids or aromatic carboxylic acids which are optionally used in the unsaturated polyesters according to the present invention, together with the unsaturated polycarboxylic acids, include, for example, monocarboxylic acids, such as acetic acid, butyric acid and dodecanoic acid, preferably dicarboxylic acids, such as succinic acid, adipic acid, sebacic acid, orthophthalic acid, isophthalic acid, terephthalic acid, tetrachloro- and -bromophthalic acid and HET acid, and polycarboxylic acids, such as benzene-tricarboxylic acids, benzene-tetracarboxylic acids and the like. These acids can also be used in the form of their functional derivatives, such as anhydrides, chlorides, esters and the like.

The polyhydric alchols are those conventionally used in the preparation of unsaturated polyesters, for example, ethylene glycol, diethylene glycol, triethylene glycol, higher polyethylene glycols, propylene-1,2- and -1,3-glycol, dipropylene glycol, neopentyl glycol, diphenylolpropane (or bisphenol A), glycerol, pentaerythritol, trimethylolpropane and the like.

The halogenated salicylic acid derivatives of General Formula I may be a monochlorinated or monobrominated derivative of salicylic acid, such as 3-, 4- or 5-chloro- or bromosalicylic acid. Since, however, the fireproofing power of the halogenated salicylic acids used according to the present invention is directly dependent upon their halogen content, preference is given to di-, tri- and tetrahalogenated salicylic acids, for example, 3,4-, 3,5- or 3,6-dichlorosalicylic acid, 3,5- or 4,6-dibromosalicylic acid, 3,5,6-trichloro- or tribromosalicylic acid, 3,4,5,6-tetrachloro- or tetrabromosalicylic acid, 4-bromo-3,5,6-trichlorosalicylic acid or the like. Since the fireproofing power of brominated salicylic acids is greater than that of chlorinated salicylic acids having an equal halogen content, it is preferred to use the brominated derivatives in the performance of the present invention. Finally, among the di-, tri- and tetrabrominated salicylic acids, 3,5-dibromosalicylic acid occupies a special position because it is easily obtained in excellent yields by the bromination of salicylic acid. Instead of free salicylic acid, it is also possible to use its functional derivatives.

The copolymerizable mono-ethylenically unsaturated monomer, in which is dissolved the unsaturated polyester containing the halogenated salicylic acid incorporated chemically in accordance with the present invention, is one of those used conventionally for the cross-linking of unsaturated polyesters, for example styrene, substituted styrenes, acrylate and substituted acrylates, allyl esters and the like, preference being given to styrene for reasons of cost and availability.

As in the case of conventional unsaturated polyester resins, the resins according to the present invention may, in addition, contain polymerization inhibitors or promoters, gelling inhibitors, agents providing protection against ultra-violet rays, mineral or fibrous organic or pulverulent fillers, for example glass fibres, pigments, dyestuffs and the like.

The amount of halogenated salicylic acid derivative of General Formula I to be incorporated in the course of the preparation of the fireproof unsaturated polyesters must be such that the halogen content in the total composition, will be from 10 to 30% by weight, preferably from 15 to 25% by weight.

The present invention makes it possible to prepare so-called "self-extinguishing" polymers, i.e. polymers which comply with the severest tests relating to fireproof properties. It is possible to distinguish two classes of products among the halogenated polymers prepared in accordance with the present invention. When these halogenated polymers have a bromine content of 20% by weight or more, they directly constitute self-extinguishing polymers. On the other hand, when they have a halogen content lower than 20% by weight, they are not self-extinguishing but they can easily be made self-extinguishing by utilising auxiliary fireproofing agents in known manner. These auxiliary agents may be, for example, antimony or phosphorous compounds, such as antimony trioxide, triallyloxy- stibine, tricresyl phosphate or the like. The content of auxiliary fireproofing agent, expressed as phosphorus or antimony, is preferably from 0.1 to 5% by weight, referred to the weight of the total composition, the percentage being the higher the smaller is the percentage of halogen in the polymer of the present invention.

In order to obtain the fireproof polymers according to the present invention, an unsaturated polyester is first prepared in known manner, for example, by heating the components (unsaturated polycarboxylic acid, polyhydric alcohol, halogenated salicylic acid of General Formula I and optionally an aliphatic saturated carboxylic acid or aromatic carboxylic acid) in an inert atmosphere in the presence of an azeotropic dehydration agent, such as xylene. The polycondensation is stopped when the acid number of the product thus obtained has become lower than 85 mg. of potassium hydroxide/g. of polyester. The solvent is then driven off by evaporation, preferably in vacuo, and the mono-ethylenically unsaturated copolymerizable monomer is introduced into the unsaturated polyester thus obtained, in such a manner as to obtain a liquid resin suitable for pouring. The weight ratio of polyester to monoethylenically unsaturated copolymerizable monomer is preferably between 60/40 and 90/10. At this moment, the required amount of auxiliary fireproofing agent, fillers, pigments and other conventional additives are added, if desired, and the polymerization is effected in known manner in the presence of a free-radical initiator. This polymerization may be carried out in a hot or cold state; if necessary, thermosetting may be effected in order to complete the cross-linking reaction which occurs.

The fireproof polymers according to the present invention are suitable for all normal uses of unsaturated polyesters in general.

The method of the present invention offers numerous advantages: the products obtained possess fireproofing and mechanical properties at least equal to and sometimes better than those obtained with traditional fireproofing agents, such as tetrabromophthalic acid, HET acid and the like (see the following examples); it provides transparent polymer films which are practically colourless or slightly pinkish in colour; the salicylic acid used as starting material for the halogenated acids used according to the invention is an abundant, easily obtainable and inexpensive starting material and 3,5-dibromosalicylic acid can easily be prepared without great expense for operating or for equipment, in yields close to the theoretical yield. A starting material is thus available which enables the cost of fireproof polymers to be considerably reduced and, consequently, enables their field of use to be extended to uses which were previously precluded for economic reasons.

The following examples are given for the purpose of illustrating the present invention:

EXAMPLE 1

(a) Preparation of 3,5-dibromosalicylic acid 1381 g. (10 mols) salicylic acid and 5 litres 80% by weight aqueous acetic acid are introduced successively into a 10-litre round-bottomed flask equipped with an agitator, a dropping funnel, a reflux cooler and a washing column. 3200 g. (1025 ml. of 20 mols) bromine are added slowly. The temperature rises to 50–70° C. In order to complete the reaction, the reaction mixture is heated at 100° C. for 15 minutes. The reaction mixture is cooled and the resulting suspension filtered. The solid material is washed with 200 ml. 80% acetic acid and then with 500 ml. water. The product is dried at 100° C. and 3,5-dibromosalicylic acid is thus obtained in the form of white needles. Yield: 2720–2900 g., i.e. 92–98% of theory. Melting point: 226–228° C.

It can be used in this form in the subsequent operations described below.

(b) Preparation of a resin containing about 15% of bromine

The following quantities of starting materials are used:

| | G. |
|---|---|
| Maleic anhydride | 247 |
| 3,5-dibromosalicylic acid | 267 |
| Ethylene glycol | 91 |
| Diethylene glycol | 156 |
| Styrene | 300 |
| | [1]1061 |

[1] After elimination of the esterification water, this quantity of 1061 g. of starting materials gives about 1000 g. of resin.

Polyesterification is effected by heating the maleic anhydride, 3,5-dibromosalicylic acid, ethylene glycol and diethylene glycol in a Dean and Stark apparatus in an atmosphere of nitrogen and in the presence of xylene in order to eliminate the resulting water in the form of an azeotropic mixture. The maximum temperature attained is 180° C. When the acid value of the mixture is between 75 and 85 mg. of potassium hydroxide/g. of resin, which takes about 8 hours, volatile materials are eliminated at 160° C./20 mm. Hg and then, while still hot, the 300 g. of styrene, together with hydroquinone (150 p.p.m., referred to the total weight) are added. 1000 g. of a resin containing, by weight, 70% polyester and 30% styrene are thus obtained.

The properties of the resin are as follows:

| | |
|---|---|
| Bromine content | percent 14.4 |
| Density | kg./litre 1.3 |
| Colour | Pink |
| Reactivity | |

This test is intended to show the speed at which the resin is cross-linked. 2 ml. of methyl ethyl ketone peroxide containing 50% of active material, and 1 ml. of cobalt octoate, containing 1% of cobalt, are added to 50 g. of the resin. Polymerization is effected at ambient temperature. The reactivity of the resin is characterized by the following values:

| | |
|---|---|
| Gelling time (GT) | mins 14 |
| Time required to attain exothermic peak (CT) | mins 85 |
| Exothermic peak (PE) | ° C 85 |

(c) Production of cross-linked polymer 2 g. of a 50% suspension of benzoyl peroxide in dibutyl phthalate is added to 100 g. of the resin obtained in 1(b) and the mixture is heated at 100° C. for 2 hours. A cross-linked polymer, the originally pinkish tint of which fades in the course of cross-linking, is thus obtained.

The results obtained in various tests of the properties of the polymer produced in this manner are given in the following Table I:

TABLE I

Mechanical tests:

| | |
|---|---|
| Barcol hardness [1] | 42.5 |
| Bending strength | kg./cm.[2] 825 |
| Impact strength | kg. cm./cm.[2] 11.3 |
| Tensile strength | kg./cm.[2] 430 |

Fireproofing tests:

| | |
|---|---|
| Globar test [2] | [3] mm./minute 3 |
| HLT-15 test [4] | 20 |
| Oxygen index [5] | 0.33 |

[1] Measurement made with a Barber Colman apparatus No. 934-1.
[2] ASTM D-757-49 standard.
[3] Does not burn.
[4] Expressed by values from 0 to 100, 100 constituting the optimum value (see (A. J. Hammerl, SPI Div. of Reinforced Plastics, 17th Ann. Teach. Conf. Chicago, 1962, Section 12H, pp. 1-6).
[5] Or "Candle test" (C. P. Fennimore and F. J. Martin, Modern Plastics (1966), pp. 141-148 and 192). See also (J. L. Isaacs, Modern Plastics (1970), pp. 124-130).

In order to obtain a value of 100 in the HLT-15 test, it is sufficient to add to the resin either 5% by weight of triethyl phosphate (0.85% by weight of phosphorus) or 1% by weight of antimony trioxide.

EXAMPLE 2

(a) Preparation of resins containing about 20% by weight of bromine

Three resins A, B and C according to the present invention are prepared from the following starting material (in g.):

| Resin | A | B | C |
|---|---|---|---|
| Maleic anhydride | 136 | 171 | 146 |
| Phthalic anhydride | 23 | | |
| Adipic acid | | 28 | 54 |
| 3,5-dibromosalicylic acid | 365 | 367 | 372.5 |
| Propylene glycol | | 194.5 | 189.5 |
| Diethylene glycol | 114 | | |
| Neopentyl glycol | 112 | | |
| Styrene | 300 | 300 | 300 |
| Total [1] | 1,050 | 1,060.5 | 1,062.0 |

[1] Deducting the polyesterification water from the totals, 1,000 g. of resins A, B and C is thus obtained in each case.

The mode of operation is the same as in Example 1. The properties of the resins obtained are as follows:

| Resin | A | B | C |
|---|---|---|---|
| Bromine content (percent) | 19.7 | 19.8 | 20.8 |
| Density (kg./litre) | 1.27 | 1.28 | 1.29 |
| Coloration (APHA) | 450 | 400 | 200 |
| Viscosity (cp., 25° C.) | 80 | 90 | 65 |
| Reactivity SPI: | | | |
| (GT)(minutes) | 10.2 | 10.5 | 8.9 |
| (CT)(minutes) | 16.0 | 14.5 | 13.5 |
| (PE)(° C.) | 163 | 190 | 168 |

(b) Production of cross-linked polymers

The mode of operation for the cross-linking is exactly the same as in Example 1(c).

Table II shows the results of the tests carried out with these three polymers:

TABLE II

| Polymer | A | B | C |
|---|---|---|---|
| Mechanical tests: | | | |
| BARCOL hardness | 36 | 40 | 38 |
| Bending strength (kg./cm.²) | 961 | 744 | 877 |
| Impact strength (kg. cm./cm.²) | 10.3 | 11.1 | 9.0 |
| Fireproofing tests: | | | |
| GLOBAR test (mm./minute; does not burn) | 3.0 | 3.3 | 3.0 |
| HLT-15 | 100 | 100 | 100 |

If, for the cross-linking, 0.05% of triphenyl phosphite and 0.5% of epichlorohydrin are added to these resins, colourless, transparent polymers are obtained, utilising a methyl ethyl ketone peroxide/2-mercaptoethanol system as redox catalyst.

EXAMPLE 3

(a) Preparation of resins containing about 20% by weight of bromine

Two resins D and E according to the present invention are prepared from the following starting materials (in g.):

| Resin | D | E |
|---|---|---|
| Maleic anhydride | 180 | 169 |
| 3,5-dibromosalicyclic acid | 362 | 364 |
| Propylene glycol | 56 | 51 |
| Dipropylene glycol | | 74 |
| Diethylene glycol | 129 | 65 |
| Glycerol | 34 | 34 |
| Styrene | 300 | 300 |
| Total | 1,061 | 1,058 |

The mode of operation is the same as in Example 1. The properties of the resins are as follows:

| Resin | D | E |
|---|---|---|
| Bromine content (percent) | 19.6 | 19.7 |
| Density (kg./litre) | 1.295 | 1.279 |
| Coloration (APHA) | 125 | 100 |
| Viscosity (cp., 25° C.) | 500 | 600 |
| Reactivity SPI; | | |
| (GT) (minutes) | 9.0 | 6.9 |
| (CT) (minutes) | 12.2 | 10.8 |
| (PE) (° C.) | 201.5 | 183.5 |

(b) Production of cross-linked polymers

The mode of operation for the cross-linking is the same as in Example I(c). Table III shows the results of the tests carried out with these two polymers:

TABLE III

| Polymer | D | E |
|---|---|---|
| Mechanical tests; | | |
| BARCOL hardness | 44 | 44 |
| Bending strength (kg./cm.$^2$) | 850 | 1,090 |
| Impact strength (kg. cm./cm.$^2$) | 13.8 | 10.8 |
| Tensile strength (kg./cm.$^2$) |  | 360 |
| Fireproofing tests; | | |
| GLOBAR test (mm./minute) (does not burn) | 1.9 | 1.9 |
| HLT-15 test | 100 | 100 |
| Oxygen index | 0.31 | 0.31 |

(c) Production of reinforced cross-linked polymers

Reinforced cross-linked polymers containing a layer of fibreglass mat with a 30% of total weight glass content are prepared. Cross-linking is obtained in the same way as in Example 1(c). Table IV shows the results of the tests carried out with these two resins:

TABLE IV

| Polymer | D | E |
|---|---|---|
| Mechanical tests; | | |
| BARCOL hardness | 53 | 53 |
| Bending strength (kg./cm.$^2$) | 1,750 | 1,620 |
| Impact strength (kg. cm./cm.$^2$) | 49.5 | 56.6 |
| Fireproofing tests; | | |
| GLOBAR test (mm./minute) (does not burn) | 1.3 | 1.3 |
| HLT-15 test | 100 | 100 |

EXAMPLE 4

(a) Preparation of tetrabromosalicylic acid

Tetrabromosalicylic acid was obtained by bromination of 3,5-dibromosalicylic acid in oleum (70% $SO_3$) according to the method of L. H. Farinholt, A. P. Stuart and D. Twiss, J. Amer. Chem. Soc. 62, (1940), 1237. The product was separated by filtration and recrystallized from aqueous methanol before use in the following steps. M.P. 258–261° C. (decomposition); M.W. 454; Bromine content: calculated 70.45%, found 71.0%.

(b) Preparation of resins containing about 20% by weight of bromine

Two resins F and G according to the invention are prepared from the following starting materials (in g.):

| Resin | F | G |
|---|---|---|
| Maleic anhydride | 177 | 145 |
| Phthalic anhydride | 67 | 94 |
| Tetrabromosalicylic acid | 286 | 288 |
| Propylene glycol | 127 | 93 |
| Diethylene glycol | 95 | 130 |
| Styrene | 300 | 300 |
| Total | 1,052 | 1,050 |

The mode of operation is the same as in Example 1 except that the final acid value of the polyester is comprised between 50 and 75 mg. KOH/g. of resin. The resins have a viscosity of about 1000 cp., are transparent and yellow. Their reactivity is greater than that of the resins of Examples 2 and 3.

(c) Production of cross-linked polymers

The mode of operation is the same as in Example 1(c). Table V shows the results of the tests carried out with these two cross-linked polymers:

TABLE V

| Polymer | F | G |
|---|---|---|
| Mechanical tests; | | |
| BARCOL hardness | 44 | 34 |
| Bending strength (kg./cm.$^2$) | 720 | 900 |
| Impact strength (kg. cm./cm.$^2$) | 7.8 | 12.1 |
| Fireproofing test; HLT-15 test | 100 | 100 |

EXAMPLE 5 (COMPARISON)

This example is given in order to compare the resins according to the present invention with the resins H and J, representing the prior art, which were prepared from the following starting materials (in g.):

| Resin | H | J |
|---|---|---|
| Maleic anhydride |  | 155 |
| Fumaric acid | 103 |  |
| Phthalic anhydride |  | 72 |
| HET acid | 515 |  |
| Tetrabromophthalic anhydride |  | 296 |
| Ethylene glycol | 131 |  |
| Diethylene glycol | 33 |  |
| Propylene glycol |  | 226 |
| Styrene | 234 | 300 |
| Triethyl phosphate | 50.5 |  |
| Total | 1,066.5 | 1,049.0 |

The mode of preparation adopted is the same as in Example 1. The properties of the resins obtained are as follows:

| Resin | H | J |
|---|---|---|
| Halogen content (percent) | [1] 27.5 | [2] 20.2 |
| Phosphorus content ($Et_3PO_4$) (percent) | 0.85 | 0 |
| Density (kg./litre) | 1.3 | 1.35 |
| Coloration (APHA) | [3] 250 | [4] 750 |
| Garner viscosity (25° C., cp.), approximately | 6,000 | 1,550 |
| Reactivity SPI: | | |
| (GT) (minutes) | 6.2 | 7.7 |
| (CT) (minutes) | 9.5 | 16.4 |
| (PE) (° C.) | 172 | 201 |

[1] Cl.  [2] Br.  [3] Yellowish.  [4] Yellow.

Cross-linking, carried out as in Example 1(c), gives polymers H and J having the properties shown in the following Table VI:

TABLE VI

| Polymer | H | J |
|---|---|---|
| Mechanical tests: | | |
| BARCOL hardness | 26.7 | 46 |
| Bending strength (kg./cm.$^2$) | 875 | 481 |
| Impact strength (kg. cm./cm.) | 11.5 | 8.1 |
| Fireproofing tests: | | |
| GLOBAR test (mm./minute) | [1] 5.6 | [2] 3.5 |
| HLT-15 test | 80 | [3] 68 |

[1] Burns.
[2] Does not burn.
[3] In order to obtain the value 100 in this test, the bromine content must be increased to 23.5% by weight.

In conclusion, comparing the data in Examples 1 to 4 with the data of Example 5, it is found that:

(a) The coloration of the resins according to the present invention compares favourably with that resin H and J, which is important from the point of view of use;

(b) The hardness values of the polymers according to the present invention are close to those of non-fireproof polyesters available commercially, which are of the order of 4°–50 BARCOL hardness units, and they are markedly higher than those of polymer H but slightly inferior to those of polymer J;

(c) As regards bending strength, the polymers of the present invention are at least equivalent to polymer H and substantially better than polymer J;

(d) The same is true with regard to impact strength, which is of the same order as that of polymer H and better than that of polymer J;

(e) The fireproofing tests considered jointly show that 20% of bromine in the polymers according to the present invention is sufficient to equal and even to exceed the fireproofing rate of polymer H, which, nevertheless, contains 27.5% of chlorine and 0.85% of phosphorus, and to exceed considerably polymer J, which contains the same 20% bromine content. Finally, comparing the polymer of Example 1 with polymer H, it is seen that, with 15% bromine and 0.85% phosphorus, the fireproofing is better than that provided by 27.5% chlorine and 0.85% phosphorus.

We claim:

1. An unsaturated polyester resin composition, which comprises
   (a) a polycondensation product of at least one organic unsaturated aliphatic polycarboxylic acid, at least one polyhydric alcohol and at least one halogenated salicylic acid derivative of the formula

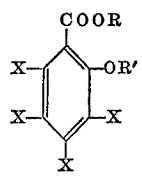

wherein
   X is a member selected from the group consisting of hydrogen and halogen selected from the group consisting of chlorine and bromine, at least one of the X's being a halogen atom,
   R is a member selected from the group consisting of hydrogen, alkyl and aryl, and
   R' is a member selected from the group consisting of hydrogen, alkanoyl and aroyl, and
   (b) a monoethylenically unsaturated copolymerizable monomer, the total halogen content of the composition being 10 to 30% by weight.

2. An unsaturated polyester resin composition according to claim 1, wherein the halogenated salicylic acid derivative is selected from the group consisting of di-, tri- and tetrahalogenated salicylic acids.

3. An unsaturated polyester resin composition according to claim 1, wherein the halogen in the halogenated salicylic acid derivative is bromine.

4. An unsaturated polyester resin composition according to claim 1, wherein the halogenated salicylic acid derivative is 3,5-dibromosalicylic acid.

5. An unsaturated polyester resin composition according to claim 1, wherein the halogen content in the total composition is 15 to 25% by weight.

6. An unsaturated polyester resin composition according to claim 1, wherein the halogen is bromine and the bromine content in the total composition is at least 20%.

7. An unsaturated polyester resin composition according to claim 1, wherein said composition contains 0.1 to 5% by weight of an auxiliary fireproofing agent selected from the group consisting of antimony and phosphorus compounds.

8. A fireproof polymer, obtained by the polymerization of an unsaturated polyester resin composition according to claim 1.

9. A reinforced fireproof polymer, obtained by the polymerization of an unsaturated polyester resin composition according to claim 1.

10. An unsaturated polyester resin composition according to claim 1 wherein the weight ratio of polyester to copolymerizable monomer is between 60/40 and 90/10.

11. An unsaturated polyester resin composition, which comprises
    (a) a polycondensation product of at least one organic unsaturated aliphatic polycarboxylic acid, at least one organic saturated aliphatic carboxylic acid or aromatic carboxylic acid, at least one polyhydric alcohol and at least one halogenated salicylic acid derivative of the formula

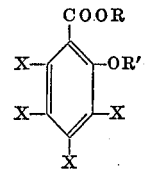

wherein
    X is a member selected from the group consisting of hydrogen and halogen selected from the group consisting of chlorine and bromine, at least one of the X's being a halogen atom,
    R is a member selected from the group consisting of hydrogen, alkyl and aryl, and
    R' is a member selected from the group consisting of hydrogen, alkanoyl and aroyl, and
    (b) a monoethylenically unsaturated copolymerizable monomer, the total halogen content of the composition being 10 to 30% by weight.

12. A fireproof polymer obtained by the polymerization of an unsaturated polyester resin composition according to claim 11.

13. A reinforced fireproof polymer, obtained by the polymerization of an unsaturated polyester resin composition according to claim 11.

14. An unsaturated copolymerizable polyester consisting of the polycondensation product of at least one organic unsaturated aliphatic polycarboxylic acid, at least one polyhydric alcohol and at least one halogenated salicylic acid derivative of the formula

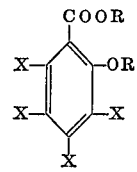

wherein

X is a member selected from the group consisting of hydrogen and halogen selected from the group consisting of chlorine and bromine, at least one of the X's being a halogen atom,
R is a member selected from the group consisting of hydrogen, alkyl and aryl, and
R' is a member selected from the group consisting of hydrogen, alkanoyl and aroyl, the total amount of the halogenated salicylic acid being such as to yield compositions having 10 to 30% by weight halogen when said polyester is mixed with a monoethylenically unsaturated copolymerizable monomer in a ratio of between 60/40 and 90/10.

15. An unsaturated copolymerizable polyester consisting of the polycondensation product of at least one organic unsaturated aliphatic polycarboxylic acid, at least one organic saturated aliphatic carboxylic acid or aromatic carboxylic acid, at least one polyhydric alcohol and at least one halogenated salicylic acid derivative of the formula

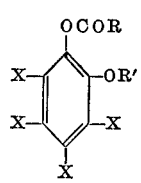

wherein

X is a member selected from the group consisting of hydrogen and halogen selected from the group consisting of chlorine and bromine, at least one of the X's being a halogen atom, R is a member selected from the group consisting of hydrogen, alkyl and aryl, and R' is a member selected from the group consisting of hydrogen, alkanoyl and aroyl, the total amount of the halogenated salicylic acid being such as to yield compositions having 10 to 30% by weight halogen when said polyester is mixed with a monoethylenically unsaturated copolymerizable monomer in a ratio of between 60/40 and 90/10.

References Cited

UNITED STATES PATENTS 2,981,707  4/1961  Heinrich et al.

MELVIN GOLDSTEIN, Primary Examiner

U.S. Cl. X.R.

260—47 C, Dig. 24